United States Patent
Attar et al.

(10) Patent No.: US 10,206,062 B2
(45) Date of Patent: *Feb. 12, 2019

(54) PROVIDING HOTSPOTS TO USER DEVICES WITHIN SERVER-CONTROLLED ZONES

(71) Applicant: Google Inc., Mountain View, CA (US)

(72) Inventors: Hossein Attar, Richmond Hill (CA); Ilia Tulchinsky, Maple (CA); Aaron David Kemp, Kitchener (CA); Andrew Wahbe, Kitchener (CA); Jerred James Costanzo, Toronto (CA)

(73) Assignee: Google LLC, Mountain View, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 14/850,342

(22) Filed: Sep. 10, 2015

(65) Prior Publication Data
US 2016/0029164 A1    Jan. 28, 2016

Related U.S. Application Data

(63) Continuation of application No. 13/369,182, filed on Feb. 8, 2012, now Pat. No. 9,144,008.

(60) Provisional application No. 61/586,820, filed on Jan. 15, 2012.

(51) Int. Cl.
*H04W 4/02* (2018.01)
*H04W 4/021* (2018.01)
(Continued)

(52) U.S. Cl.
CPC ........... *H04W 4/021* (2013.01); *H04W 4/027* (2013.01); *H04W 4/029* (2018.02); *H04W 48/08* (2013.01); *H04W 4/02* (2013.01)

(58) Field of Classification Search
CPC ..... H04W 4/021; H04W 4/027; H04W 4/028; H04W 48/08; H04W 4/02
See application file for complete search history.

(56) References Cited

U.S. PATENT DOCUMENTS 6,026,375 A    2/2000  Hall et al.
6,298,125 B1   10/2001 Goldberg et al.
(Continued)

FOREIGN PATENT DOCUMENTS

CN    101371513 A    2/2009
CN    102047695 A    5/2011
(Continued)

OTHER PUBLICATIONS

European Examination Report on 13735779.4, dated Feb. 28, 2017.
(Continued)

*Primary Examiner* — Mehmood B. Khan
(74) *Attorney, Agent, or Firm* — Foley & Lardner LLP (57) ABSTRACT

A user installs a hotspot alert application on their mobile device. The application employs the location technology of the user device to transmit the location of the device, and thus the location of the user. The location can be transmitted to a server located in a hotspot tracking system. By establishing the location of the user, the server may search for hotspots on a database stored on the system. The server establishes the dimensions of a hotspot zone around the user's location and transmits the hotspots and the zone dimensions to the application on the user device. The application monitors the location of the user device and deliver's configured alerts to the user when approaching a hotspot. When the device leaves a zone or remains idle for a configured amount of time, the device requests and receives an updated zone of hotspots.

17 Claims, 3 Drawing Sheets

(51) Int. Cl.
*H04W 48/08* (2009.01)
*H04W 4/029* (2018.01)

(56) References Cited

U.S. PATENT DOCUMENTS

| | | |
|---|---|---|
| 6,414,635 B1 | 7/2002 | Stewart et al. |
| 6,490,432 B1 | 12/2002 | Wegener et al. |
| 6,587,835 B1 | 7/2003 | Treyz et al. |
| 7,062,469 B2 | 6/2006 | Meyers et al. |
| 7,519,470 B2 | 4/2009 | Brasche et al. |
| 7,529,850 B2 | 5/2009 | Verma et al. |
| 7,676,369 B2 | 3/2010 | Fujimoto et al. |
| 7,865,308 B2 | 1/2011 | Athsani et al. |
| 8,019,532 B2 | 9/2011 | Sheha et al. |
| 8,229,473 B1 | 7/2012 | De La Rue |
| 8,335,524 B2 | 12/2012 | Shutter |
| 8,427,308 B1 | 4/2013 | Baron et al. |
| 8,463,280 B1* | 6/2013 | Lim .................. H04W 28/26 455/452.1 |
| 8,538,393 B1* | 9/2013 | Beyer, Jr. .............. H04W 4/90 455/414.2 |
| 8,589,069 B1* | 11/2013 | Lehman ............... G01C 21/20 340/995.1 |
| 8,600,659 B1* | 12/2013 | Scherzinger ....... G01C 21/3682 701/25 |
| 8,924,147 B2 | 12/2014 | Vellaikal et al. |
| 2001/0001145 A1 | 5/2001 | Barnett et al. |
| 2001/0014868 A1 | 8/2001 | Herz et al. |
| 2002/0095333 A1 | 7/2002 | Jokinen et al. |
| 2002/0133424 A1 | 9/2002 | Joao |
| 2003/0004802 A1 | 1/2003 | Callegari |
| 2003/0004831 A1 | 1/2003 | Owens |
| 2003/0005056 A1 | 1/2003 | Yamamoto et al. |
| 2003/0050863 A1 | 3/2003 | Radwin |
| 2003/0132973 A1* | 7/2003 | Hughes ............... G06F 3/04815 715/850 |
| 2003/0220835 A1 | 11/2003 | Barnes, Jr. |
| 2004/0156372 A1* | 8/2004 | Hussa .................. H04W 48/20 370/401 |
| 2004/0181461 A1 | 9/2004 | Raiyani et al. |
| 2004/0215517 A1 | 10/2004 | Chen et al. |
| 2004/0236850 A1* | 11/2004 | Krumm ................. H04L 29/06 709/224 |
| 2005/0029342 A1 | 2/2005 | Sugimoto et al. |
| 2005/0130676 A1* | 6/2005 | Broussard ............... H04W 4/02 455/456.6 |
| 2005/0143094 A1 | 6/2005 | Reed et al. |
| 2005/0209921 A1 | 9/2005 | Roberts et al. |
| 2006/0011721 A1 | 1/2006 | Olsen et al. |
| 2007/0167173 A1* | 7/2007 | Halcrow ................ G01S 5/0027 455/456.2 |
| 2007/0275736 A1 | 11/2007 | Baek et al. |
| 2007/0281690 A1 | 12/2007 | Altman et al. |
| 2008/0076451 A1 | 3/2008 | Sheha et al. |
| 2008/0165711 A1* | 7/2008 | Wyld .................. H04L 12/5692 370/310 |
| 2008/0176583 A1* | 7/2008 | Brachet ................ G01S 5/0236 455/456.3 |
| 2008/0186882 A1* | 8/2008 | Scherzer ............... H04W 72/02 370/310 |
| 2008/0208643 A1* | 8/2008 | Guastalla ............... G06Q 10/02 705/6 |
| 2008/0248815 A1 | 10/2008 | Busch |
| 2008/0258960 A1 | 10/2008 | Rosenberg et al. |
| 2009/0012955 A1 | 1/2009 | Chu et al. |
| 2009/0047972 A1 | 2/2009 | Neeraj |
| 2009/0081994 A1* | 3/2009 | Drobot ................. H04M 1/72563 455/412.2 |
| 2009/0164823 A1* | 6/2009 | Aaltonen ............. G01R 31/3648 713/340 |
| 2009/0167553 A1 | 7/2009 | Hong et al. |
| 2009/0181695 A1* | 7/2009 | Wirola ................. G01S 5/0252 455/456.1 |
| 2009/0276805 A1* | 11/2009 | Andrews, II ........... G06Q 30/02 725/35 |
| 2009/0278704 A1 | 11/2009 | Chhabra et al. |
| 2009/0278705 A1 | 11/2009 | Chhabra et al. |
| 2009/0282022 A1* | 11/2009 | Bennett ............ G06F 17/30675 |
| 2009/0298513 A1 | 12/2009 | Hampel et al. |
| 2009/0307096 A1 | 12/2009 | Antonellis |
| 2010/0009333 A1 | 1/2010 | Auer |
| 2010/0017126 A1 | 1/2010 | Holcman et al. |
| 2010/0076968 A1* | 3/2010 | Boyns ..................... H04W 4/21 707/732 |
| 2010/0190513 A1 | 7/2010 | Andreasson |
| 2010/0253508 A1 | 10/2010 | Koen et al. |
| 2010/0322214 A1* | 12/2010 | Workman ............. H04W 4/029 370/338 |
| 2011/0028160 A1 | 2/2011 | Roeding et al. |
| 2011/0047509 A1 | 2/2011 | Arrasvuori |
| 2011/0065423 A1* | 3/2011 | Karaoguz ............. G06Q 30/02 455/414.2 |
| 2011/0153143 A1 | 6/2011 | O'Neil et al. |
| 2011/0209221 A1* | 8/2011 | Hanson ............ G06F 17/30265 726/26 |
| 2011/0224864 A1* | 9/2011 | Gellatly ............. G01C 21/3679 701/29.5 |
| 2011/0238476 A1 | 9/2011 | Carr et al. |
| 2011/0238514 A1 | 9/2011 | Ramalingam et al. |
| 2012/0001928 A1 | 1/2012 | Sheha et al. |
| 2012/0100872 A1 | 4/2012 | Alizadeh-Shabdiz et al. |
| 2012/0108265 A1 | 5/2012 | Morin |
| 2012/0130817 A1 | 5/2012 | Bousaleh et al. |
| 2012/0140749 A1* | 6/2012 | Caldwell ............... H04W 48/18 370/338 |
| 2012/0147862 A1* | 6/2012 | Poojary .................. H04L 67/12 370/338 |
| 2012/0172019 A1 | 7/2012 | Scott et al. |
| 2012/0230191 A1* | 9/2012 | Fang .................. H04W 36/22 370/235 |
| 2012/0235812 A1 | 9/2012 | Maia et al. |
| 2012/0242511 A1 | 9/2012 | Morgan et al. |
| 2012/0259706 A1* | 10/2012 | Lobaza ............. G01C 21/3679 705/14.62 |
| 2012/0270521 A1* | 10/2012 | Lopez Garcia ....... H04L 63/107 455/411 |
| 2012/0295639 A1 | 11/2012 | Fitoussi et al. |
| 2012/0310527 A1 | 12/2012 | Yariv et al. |
| 2013/0005362 A1 | 1/2013 | Borghei |
| 2013/0067044 A1* | 3/2013 | Levy-Yurista ........ H04L 61/103 709/220 |
| 2013/0091452 A1 | 4/2013 | Sorden et al. |
| 2013/0103697 A1* | 4/2013 | Hill .................. G06F 17/30312 707/748 |
| 2013/0155851 A1* | 6/2013 | Koodli ................ H04L 45/308 370/230 |
| 2013/0155965 A1* | 6/2013 | Koodli ................ H04W 64/003 370/329 |
| 2013/0178233 A1 | 7/2013 | McCoy et al. |
| 2013/0179275 A1 | 7/2013 | Harb |
| 2013/0267253 A1* | 10/2013 | Case .................... H04W 4/021 455/456.3 |
| 2013/0267255 A1* | 10/2013 | Liu ..................... H04W 4/029 455/456.3 |
| 2013/0290106 A1 | 10/2013 | Bradley et al. |
| 2013/0303195 A1* | 11/2013 | Bahl ................... H04W 64/006 455/456.3 |
| 2014/0019255 A1* | 1/2014 | Wu ..................... B60L 1/003 705/14.64 |
| 2014/0143408 A1* | 5/2014 | Workman ............. H04W 4/029 709/224 |

FOREIGN PATENT DOCUMENTS

| | | |
|---|---|---|
| EP | 2 158 784 A1 | 3/2010 |
| JP | 11-328222 | 11/1999 |
| JP | 2001-223712 | 8/2001 |
| JP | 2001-256398 | 9/2001 |
| JP | 2002-245077 | 8/2002 |
| JP | 2002-304562 | 10/2002 |

(56) References Cited

FOREIGN PATENT DOCUMENTS

| | | |
|---|---|---|
| JP | 2002-340588 | 11/2002 |
| JP | 2003-006543 | 1/2003 |
| JP | 2003-091678 | 3/2003 |
| JP | 2003-115001 | 4/2003 |
| JP | 2003-158777 | 5/2003 |
| JP | 2003-203084 | 7/2003 |
| JP | 2003-296625 A | 10/2003 |
| JP | 2004-078674 | 3/2004 |
| JP | 2004-157499 | 6/2004 |
| JP | 2004-272463 | 9/2004 |
| JP | 2007-011161 | 1/2007 |
| JP | 2009-100391 | 5/2009 |
| JP | 2011-124936 | 6/2011 |
| KR | 1020120071957 | 7/2012 |
| WO | WO-03/038377 | 5/2003 |
| WO | WO-2008/148191 | 12/2008 |
| WO | WO-2013/106870 A1 | 7/2013 |

OTHER PUBLICATIONS

Japanese Office Action on 2014-552384, dated Dec. 5, 2016.
Australian Patent Examination Report No. 1 on AU 2013205204, dated Aug. 4, 2014, 4 pgs.
CA 2,864,784 Office Action dated Sep. 1, 2015, 5 pgs.
Extended European Search Report on EP 13735779.4, dated Sep. 2, 2015, 10 pgs.
International Search Report and Written Opinion of PCT/US2015/015511, dated May 28, 2015, 61 pgs.
International Search Report/Written Opinion in PCT/US2014/044202, dated Sep. 30, 2014, 7 pgs.
International Search Report/Written Opinion on PCT/US2013/021594, dated Apr. 1, 2013, 9 pgs.
International Search Report/Written Opinion on PCT/US2014/020781, dated Jun. 27, 2014, 9 pgs.
Kolmel et al., Real Life Scenarios of Location Based Advertising, Jan. 1, 2003, pp. 1-9.
KR 10-2014-7023023 OA dated Jun. 22, 2015, 12 pgs.
Oz, E., Management Information Systems—Sixth Edition, Jan. 1, 2009, pp. 1-36.
Spilling et al., Performance Enhancement in Cellular Networks with Dynamic Cell Sizing, Jan. 1, 2000, pp. 1589-1593.
Stikeman, A., Biometrics, Technology Review, 104(1), Jan. 1, 2001, pp. 106-107.
Time-Limited Coupons and Tickets for Wearable Display, with Peer-to-Peer Replication, IP.com, Jun. 17, 2004, pp. 1-4.
U.S. Notice of Allowability on U.S. Appl. No. 13/369,182, dated Jul. 7, 2015, 9 pgs.
U.S. Notice of Allowance on U.S. Appl. No. 13/369,182 dated May 21, 2015, 13 pgs.
U.S. Notice of Allowance on U.S. Appl. No. 13/369,182, dated Jul. 23, 2015, 10 pgs.
U.S. Notice of Allowance on U.S. Appl. No. 13/369,182, dated Jul. 7, 2015, 9 pgs.
U.S. Notice of Allowance on U.S. Appl. No. 13/786,434, dated Jan. 12, 2016, 6 pgs.
U.S. Notice of Allowance on U.S. Appl. No. 13/786,434, dated Feb. 9, 2016, 2 pgs.
U.S. Notice of Allowance on U.S. Appl. No. 13/931,751, dated Feb. 3, 2014, 13 pgs.
U.S. Notice of Allowance on U.S. Appl. No. 13/950,511, dated Mar. 27, 2014, 12 pgs.
U.S. Office Action on U.S. Appl. No. 13/369,182, dated Sep. 9, 2014, 10 pgs.
U.S. Office Action on U.S. Appl. No. 13/786,434, dated Aug. 27, 2015, 8 pgs.
U.S. Office Action on U.S. Appl. No. 13/842,088, dated Dec. 6, 2013, 11 pgs.
U.S. Office Action on U.S. Appl. No. 13/842,088, dated Mar. 19, 2014, 6 pgs.
U.S. Office Action on U.S. Appl. No. 13/931,751, dated Sep. 16, 2013, 22 pgs.
U.S. Office Action on U.S. Appl. No. 13/950,511, dated Nov. 21, 2013, 18 pgs.
U.S. Office Action on U.S. Appl. No. 14/179,209, dated Nov. 24, 2015, 28 pgs.
U.S. Office Action on U.S. Appl. No. 14/329,812, dated Sep. 15, 2014, 17 pgs.
U.S. Office Action on U.S. Appl. No. 14/727795, dated Oct. 26, 2015, 20 pgs.
U.S. Restriction Requirement on U.S. Appl. No. 13/369,182, dated Feb. 25, 2014, 7 pgs.
U.S. Restriction Requirement on U.S. Appl. No. 13/842,088, dated Oct. 24, 2013, 10 pgs.
U.S. Restriction Requirement on U.S. Appl. No. 14/572,755, dated Jan. 13, 2016, 9 pgs.
Canadian Office Action on 2,864,784, dated Jul. 6, 2016.
First Office Action on CN201380013941.2 dated May 12, 2017.
First Chinese Office Action on 201380013941.2 dated May 12, 2017.
Japanese Office Action on 2014-552384 dated Nov. 13, 2017.

* cited by examiner

PROVIDING HOTSPOTS TO USER DEVICES WITHIN SERVER-CONTROLLED ZONES

CROSS-REFERENCE TO RELATED PATENT APPLICATIONS

This application claims priority to and is a continuation of U.S. patent application Ser. No. 13/369,182, filed Feb. 8, 2012, herein by which claims priority to and benefit of U.S. Provisional Application 61/586,820, filed Jan. 15, 2012, incorporated herein by reference in their entirety.

TECHNICAL FIELD

The present disclosure relates generally to mobile hotspot tracking, and more particularly to delivering server-controlled hotspot zones to a mobile device.

BACKGROUND

Location data from a mobile device can be used for numerous applications. There are applications that use the location data for locating friends, playing games, and assisting a user with directions. The location data can also be used to alert a user when the user and the user's device are in the vicinity of a hotspot. A hotspot is any business, institution, or location that would be of interest to a user. For example, a user may choose to be alerted every time the user nears a particular store or restaurant, or the server may identify a hotspot as a nearby store that the user frequents and that is currently offering a promotion or coupon.

Unfortunately, hotspot information is constantly changing. New stores are built, promotions are updated, and the user location changes. A user may desire constantly updated hotspot information, but the mobile devices are not typically capable of maintaining a database of all the hotspots and hotspot marketing data. Trying to maintain this data may have an adverse effect on the data storage capacity of the device, the battery life of the device, the required data transmission capacity, or other aspects of operating a mobile device.

Conversely, tracking the location of the user device by the server and continually providing updates with hotspot data as the mobile device changes locations also adversely affects the battery, storage capacity, and data transmission capacity of the device.

Thus, a need in the art exists for systems and methods that improve upon one or more of the above-described limitations.

SUMMARY OF THE INVENTION

An aspect of the present invention provides a computer-implemented method for delivering server-controlled hotspot zones to a mobile device. A user installs a hotspot alert application ("HAA") on their mobile device. The HAA employs the location technology of the user device to determine a location of user device. The location can be transmitted to a server located in a hotspot tracking system ("HTS"). By establishing the location of the user, the HTS may search for hotspots on a database stored on the system. The HTS establishes the dimensions of a hotspot zone substantially surrounding the user's location. The HTS transmits the hotspots and the zone dimensions to the HAA. The HAA monitors the location of the user device and may deliver configured alerts to the user when approaching a hotspot. Alternatively, the HAA may notify the server when the user is approaching a hotspot, and the server may determine whether to alert the user. When the device leaves a zone or remains idle for a configured amount of time, the device requests and receives an updated zone of hotspots.

Another aspect of the present invention provides a computer program product that is installed on a user's device and on a server located in an HTS for delivering server-controlled hotspot zones to a mobile device. The computer program product includes a non-transitory computer-readable storage device having computer-readable program instructions stored therein. The computer-readable program instructions include computer program instructions for transmitting the user's location from the user device to the HTS server; searching for hotspots on a database stored on the system; establishing the dimensions of the hotspot zone around the user's location; transmitting the hotspots and the zone dimensions to the user device; monitoring the location of the device and alerting the user when approaching a hotspot; requesting and receiving updated hotspot information when the device leaves a zone or remains idle for a configured amount of time.

Another aspect of the present invention provides a system for delivering server-controlled hotspot zones to a mobile device. The HAA is configured for transmitting the user's location to the HTS server, monitoring the location of the device, and requesting and receiving updated hotspot information when the device leaves a zone or remains idle for a configured amount of time. The HAA also may alert the user when approaching a hotspot or may notify the server when the user is approaching a hotspot, and the server may determine whether to alert the user. The system includes an HTS server configured for receiving the location data; searching for hotspots on a database stored on the HTS system; establishing the dimensions of the hotspot zone around the user's location; and transmitting the hotspots and the zone dimensions to the user device.

DETAILED DESCRIPTION

Overview

The exemplary embodiments provide a hotspot alert application ("HAA") that can utilize a user's location data for delivering server-controlled hotspot zones to a mobile device. A user installs an HAA on their mobile device. The HAA can provide a user interface for entering configuration information. The HAA employs the Global Positioning System ("GPS") location technology or other location identifying technology of the user device to transmit the location of the device, and thus the location of the user. This location can be transmitted to a server located in a hotspot tracking system ("HTS"). The HAA might gather the location data directly from the device operating system, or the HAA might request the location from another location-based application operating on the phone.

The HTS receives the location data from the user device and identifies the geographical location of the device. The HTS then accesses a database for hotspot information in the vicinity of the user device. The hotspot information may be anything that would be of interest to the user. The category of hotspot information accessed might be user configured or may be selected by the HTS server based on the user's prior activities, interests, or suggestions. Examples of hotspots that may be identified by the server for transmitting to the user device might include, but would not be limited to, restaurants, stores, or other businesses frequented by the user, businesses currently offering a sale or promotion, businesses currently offering an electronic coupon, tourist attractions, museums, friends identified by their devices, or any other identifiable entity in which the user may be interested.

The HTS identifies the hotspots in the user's vicinity and uses the density or quality of the hotspot information to establish the size and boundaries of the hotspot zone to transmit to the user device. The HTS may limit the size of the hotspot zone to prevent any adverse effects caused by transmitting a quantity of data that is too large for the user device and the system to operate efficiently. For example, if the amount of hotspot data transmitted is too large, the data may require enough capacity on the data storage unit of the device to affect the normal operating of the device. Alternatively, if the size of the hotspot zone is too small, the HTS may be forced to transmit a new zone of hotspots to the device too frequently to be practical. For example, if the hotspot zone data were transmitted too frequently, it might consume the battery life of the device.

The HTS may additionally prioritize the hotspot data. Based on user input or an analysis of user historical data, such as purchasing history or website usage, the HTS may provide a ranked list of the hotspots to the user device. This ranked list may be used by the HAA to determine when or how to alert the user to the proximity of a particular hotspot. For example, the HAA may display all hotspots on a map of the zone, but only alert the user when they are approaching one of the top ten ranked hotspots.

The HAA on the user device receives the zone boundaries and the hotspot information. The HAA may be an application running on the user device that is configured for any type of hotspot locating activity. For instance, the HAA may be an application that is configured to alert a user to restaurants or stores that are a favorite of the user or are currently offering a coupon. The HAA may alert a user to museums or tourist attractions. The HAA may alert a user of other devices operating in the area that may be contacts of the user. The HAA may be focused on alerting a user to any other business or entity that the user or the server configures the HAA to monitor.

After receiving the hotspot and zone information, the HAA may display the information on a map or other grid via the user interface of the HAA. Additionally or alternatively, the HAA may display the information to the user in any other format that can convey the information, such as a simple listing of each hotspot and the distance away from the user that each hotspot is located. The HAA may further provide a route to the hotspot upon request from the user.

If displaying the information on a map view, the HAA may expand or collapse the data displayed to the user depending on the density of the data. For example, if a large number of hotspots are located in a localized area, the HAA may group hotspots together and show the grouping in a single icon or notation. An example of this may be a shopping complex that contains a quantity of hotspots too great to display on a user device. The display may simply show a shopping complex notation and list the number of hotspots contained at that location or any other manner of representing the group of hotspots. As the user approaches the dense hotspot, the grouped hotspot may expand to show the individual hotspots in that area.

After receiving the hotspot information, the mobile device continues to monitor the location of the user device. If the device approaches a hotspot, the HAA may perform any alert function configured by the user. For instance, the HAA may alert a user when the user device is within a configured range of the hotspot, such as within a block of the hotspot. The alert may additionally take any configured form desired by the user. In exemplary embodiments, the HAA may use the alert internally or may provide an audible alert, a vibration, a visible alert, such as showing the hotspot details on the display of the user device, an e-mail, or any other configurable alerting procedure. In an alternate embodiment, the HAA may alert the HTS that the device is approaching a hotspot. The HTS may perform any alert function configured by the user or store the alert for later use. The HTS may send an alert to the HAA or to another location. For example, the HTS may send an email, push notification, text message, or another communication to the user.

The HAA can be embodied as a stand-alone application program or as a companion program to a web browser, for example, as a companion program to a Hypertext Markup Language revision 5 ("HTML5") compliant web browser or other type of web browser having messaging and storage capabilities. While certain embodiments are described in which parts of the HAA are implemented in software, it will be appreciated that one or more acts or functions of the HAA may be performed by hardware, software, or a combination thereof, as may be embodied in one or more computing systems.

Users may, in appropriate circumstances, limit or otherwise affect the operation of the features disclosed in the specification. For example, users may be given an initial opportunity to opt-in or opt-out of the collection or use of certain data or the activation of certain features. In addition, a user may change the manner in which the features are employed, including for situations in which a user may have concerns regarding his privacy. Instructions may be provided to notify the users regarding policies about the use of information, including personally identifiable information and receipt information, and manners in which the users may affect such use of information.

System Architecture

Figure 1:
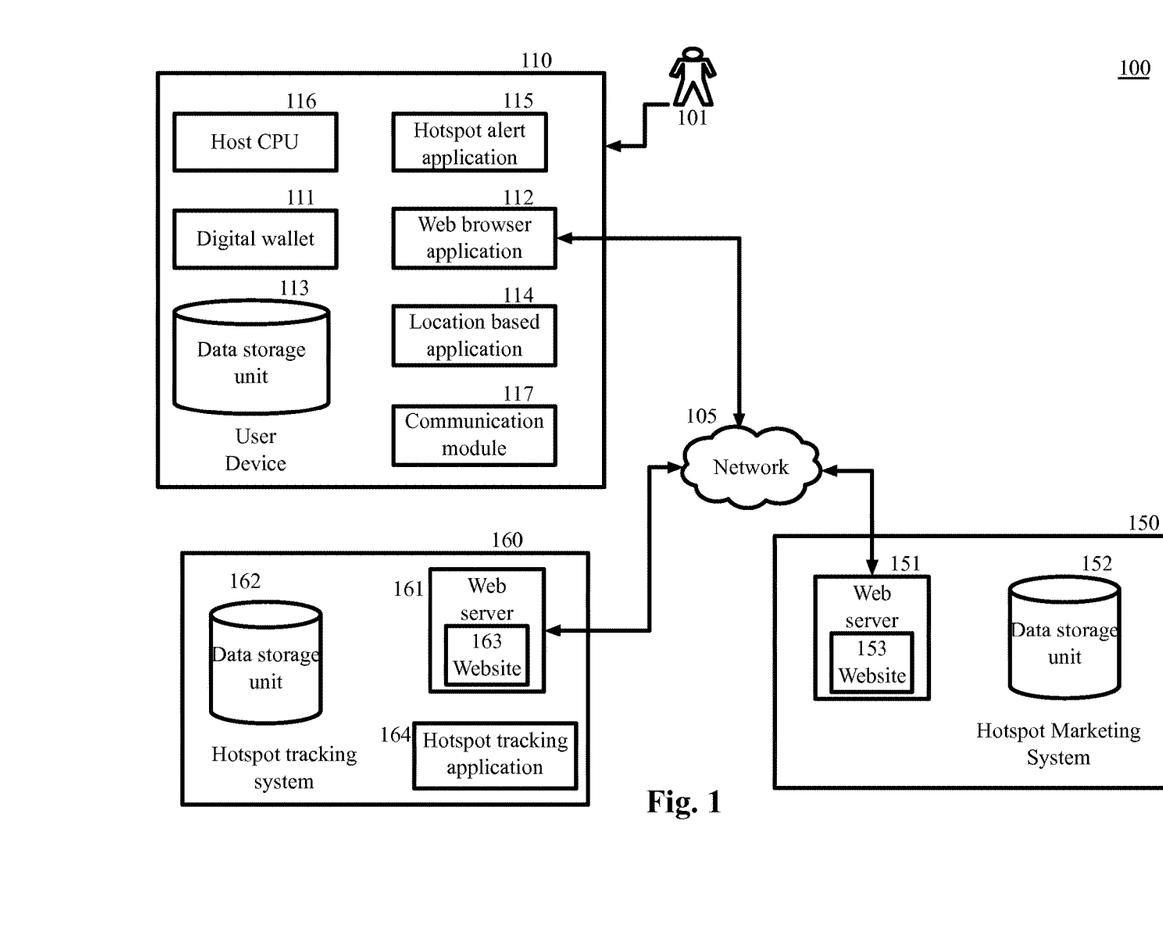
FIG. 1 is a block diagram depicting an operating environment of a hotspot alert application ("HAA"), in accordance with certain exemplary embodiments.

Turning now to the drawings, in which like numerals represent like (but not necessarily identical) elements throughout the figures, exemplary embodiments of the present invention are described in detail. FIG. 1 is a block diagram depicting an operating environment 100 for a hotspot alert application ("HAA"), in accordance with certain exemplary embodiments.

Referring to FIG. 1, the exemplary operating environment 100 includes a user network device 110 associated with a user 101, a hotspot marketing system 150, and a hotspot tracking system ("HTS") 160. The user device 110 may be a mobile device, (for example, notebook computer, tablet computer, netbook computer, personal digital assistant (PDA), video game device, GPS locator device, cellular telephone, smartphone, or other mobile device), or other appropriate technology that may include or may be coupled to a web browser application module 112 or other communication module 117. The user device 110 may employ a host CPU 116 to process the operations of the user device 110.

In certain exemplary embodiments, the web browser application 112 is an HTML5 compliant web browser. HTML5 compliant web browsers include a cross-document messaging application programming interface (API) and a local storage API that previous HTML versions did not have. The cross-document messaging API of HTML5 compliant web browsers enables documents, such as web pages, to communicate with each other. For example, a first document can send a message to a second document requesting information. In response, the second document can send a message including the requested information to the first document. The local storage API of HTML5 compliant web browsers enables the web browser to store information on a client device upon which the web browser is installed or is executing, such as the user device 110. Websites also can employ the local storage API to store information on a client device. Other web browsers having cross-document messaging and/or local storage capabilities also may be used in certain exemplary embodiments.

The user 101 can use the web browser application 112 to view, download, upload, or otherwise access documents or web pages via a distributed network 105. The network 105 includes a wired or wireless telecommunication system or device by which network devices (including devices 110, 150, and 160) can exchange data. For example, the network 105 can include a local area network ("LAN"), a wide area network ("WAN"), an intranet, an Internet, storage area network (SAN), personal area network (PAN), a metropolitan area network (MAN), a wireless local area network (WLAN), a virtual private network (VPN), a cellular or other mobile communication network, Bluetooth, NFC, or any combination thereof or any other appropriate architecture or system that facilitates the communication of signals, data, and/or messages. Throughout the discussion of exemplary embodiments, it should be understood that the terms "data" and "information" are used interchangeably herein to refer to text, images, audio, video, or any other form of information that can exist in a computer based environment.

The web browser application 112 can interact with web servers (or other computing devices) connected to the network 105, web server 151 of the hotspot marketing system 150, and the web server 161 of the HTS 160.

The user device 110 may employ a communication module 117 to communicate with the web server 161 of the HTS 160 or other servers. The communication module 117 may allow devices to communicate via technologies other than the network 105. Examples might include a cellular network, radio network, or other communication network.

The user device 110 may include a digital wallet application module 111. The digital wallet 111 may encompass any application, hardware, software, or process the user device 110 may employ to assist the device to complete a purchase transaction. The digital wallet 111 can interact with the web browser application 112 or can be embodied as a companion application of the web browser application 112. As a companion application, the digital wallet 111 executes within the web browser application 112. That is, the digital wallet 111 may be an application program embedded in the web browser application 112.

The user device 110 may include an HAA 115. The HAA 115 can interact with the web browser application 112 or be embodied as a companion application of the web browser application 112 and execute within the web browser application 112. In an exemplary embodiment, the HAA 115 may further be embodied as a companion application of the digital wallet 111 and execute within the digital wallet 111. The HAA 115 may employ a software interface that may open in the digital wallet application 111 or may open in the web browser application 112. The interface can allow the user 101 to configure the HAA 115 and the user account on the HTA 160.

The HAA 115 can be used to send device location data to the HTS 160 and receive a hotspot zone from the HTS 160. The HTS 160 that develops the hotspot zone can include a set of computer-readable program instructions, for example, using JavaScript, that enable the HTS 160 to interact with the HAA 115.

The user device 110 includes a data storage unit 113 accessible by the HAA 115 and the web browser application 112. The exemplary data storage unit 113 can include one or more tangible computer-readable media. The data storage unit 113 can be stored on the user device 110 or can be logically coupled to the user device 110. For example, the data storage unit 113 can include on-board flash memory and/or one or more removable memory cards or removable flash memory.

The user device 110 may include a location-based application 114 that the HAA 115 or the HTS 160 may utilize to access location data for the user device 110. Examples of applications that may utilize the location data, and thus may make it available to the HTS 160 or HAA 115, may include, but would not be limited to, Global Positioning System ("GPS") location technology or other location identifying technology of the user device, business finder applications such as AROUNDME, location based social networks such as FOURSQUARE, location based gaming such as GOWALLA, or friend locater applications such as GOOGLE LATITUDE. Additionally or alternately, the user device 110 may be capable of providing location data directly from the host CPU 116. The host CPU 116 may provide the location data to the HAA 115 or may be configured to transmit the location data directly to the HTS 160.

The HTS 160 utilizes a HTS server 161 operating a hotspot tracking application 164. The HTS server 161 operating the hotspot tracking application 164 may represent the computer implemented system that the HTS 160 employs to configure user accounts, create and maintain user profiles, collect the location data, communicate with the hotspot marketing system 150, develop proximate hotspot maps and zones, and submit the data to the user 101. The HTS website 163 may represent any web-based interface that allows users to interact with the HTS 160 to configure the user accounts and change account settings. The HTS server 161 can communicate with one or more hotspot marketing systems 150, and a user device 110 via any available technologies. These technologies may include, but would not be limited to, an Internet connection via the network 105, email, text, instant messaging, or other suitable communication technologies. The HTS 160 may include a data storage unit 162 accessible by the server 161 of the HTS 160. The data storage unit 162 can include one or more tangible computer-readable storage devices.

The hotspot marketing system 150 utilizes a hotspot marketing system server 151. The hotspot marketing system server 151 may represent the computer-implemented system that the hotspot marketing system 150 employs to provide hotspot identities, locations, marketing information, and descriptions to the HTS 160. The hotspot marketing system 150 may represent any number of systems that may be polled by the HTS 160 to gather hotspot information. For example, the hotspot marketing system 150 may be the marketing system of a product manufacturer or a service provider. The hotspot marketing system 150 may be a social network system of a user that can provide preferences and historical data of a user's activities, such FACEBOOK, GOOGLE+, or LINKEDIN. The hotspot marketing system 150 may be a coupon aggregator or provider. The hotspot marketing system 150 may be a mapping program such as GOOGLE MAPS or MAPQUEST. The hotspot marketing system 150 may be any other service or system that may provide information that the HTS 160 can use to define a hotspot zone and prioritize the hotspots.

The hotspot marketing system 150 can communicate with an HTS 160 and user devices 110 via any available technologies. These technologies may include, but would not be limited to, an Internet connection via the network 105, email, text, instant messaging, or other suitable communication technologies. The hotspot marketing system 150 may include a data storage unit 152 accessible by the server 151 of the hotspot marketing system 150. The data storage unit 152 can include one or more tangible computer-readable storage devices.

It will be appreciated that the network connections shown are exemplary and other means of establishing a communications link between the computers and devices can be used. Moreover, those having ordinary skill in the art having the benefit of the present disclosure will appreciate that the user device 110, hotspot marketing system 150, and HTS 160 illustrated in FIG. 1 can have any of several other suitable computer system configurations. For example, a user device 110 embodied as a mobile phone or handheld computer may not include all the components described above.

System Process

The components of the exemplary operating environment 100 are described hereinafter with reference to the exemplary methods illustrated in FIG. 2-3. The exemplary embodiments can include one or more computer programs that embody the functions described herein and illustrated in the appended flow charts. However, it should be apparent that there could be many different ways of implementing aspects of the exemplary embodiments in computer programming, and these aspects should not be construed as limited to one set of computer instructions. Further, a skilled programmer would be able to write such computer programs to implement exemplary embodiments based on the flow charts and associated description in the application text. Therefore, disclosure of a particular set of program code instructions is not considered necessary for an adequate understanding of how to make and use the exemplary embodiments. Further, those skilled in the art will appreciate that one or more acts described may be performed by hardware, software, or a combination thereof, as may be embodied in one or more computing systems.

Figure 2:
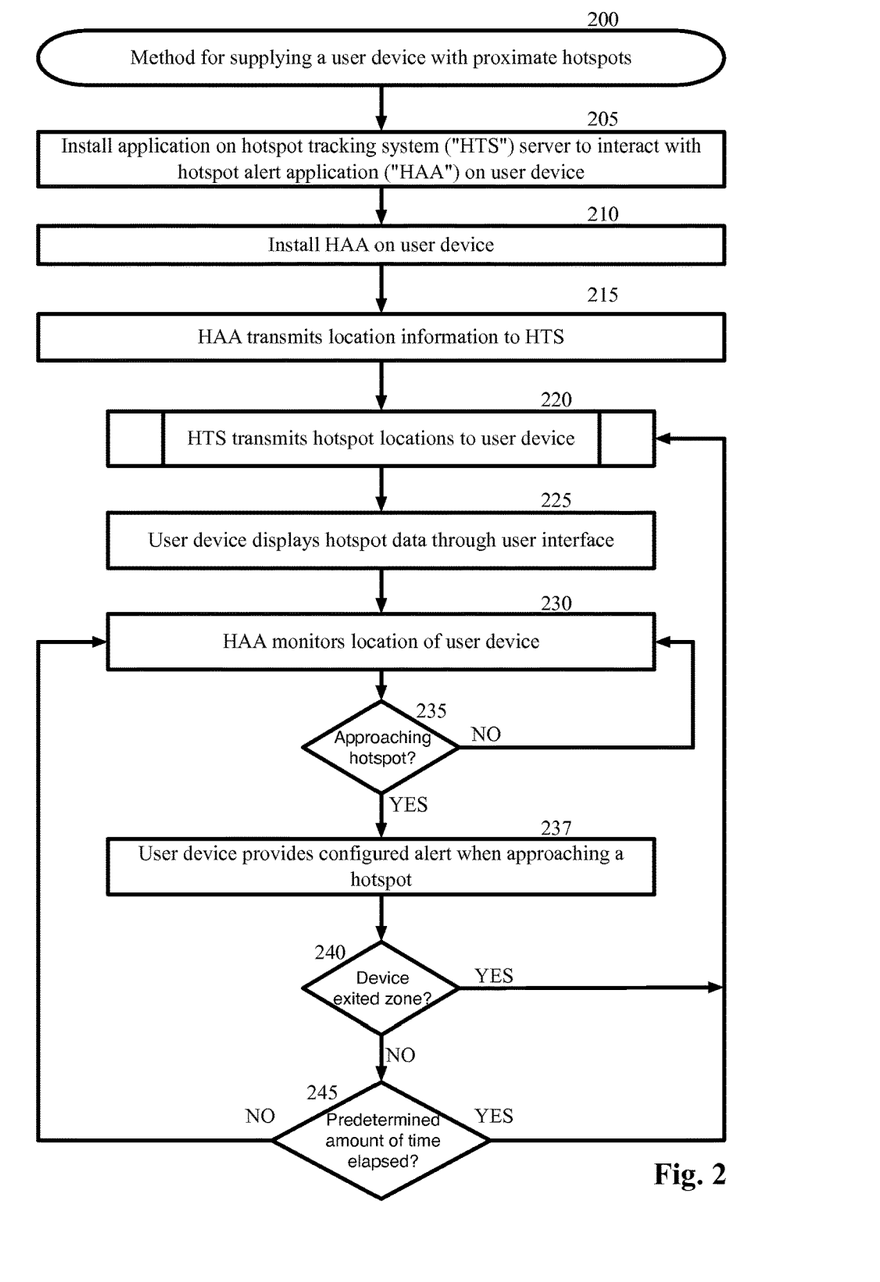
FIG. 2 is a block flow diagram depicting a method for supplying a user device with proximate hotspots, in accordance with certain exemplary embodiments.

FIG. 2 is a flow chart depicting a method 200 for supplying a user device with proximate hotspots, in accordance with certain exemplary embodiments.

With reference to FIGS. 1 and 2, in block 205, the hotspot tracking system ("HTS") 160 installs computer-readable program instructions on the HTS server 161 for interacting with the hotspot alert application ("HAA") 115 on the user device 110. Additionally, the HTS 160 installs computer-readable program instructions on the HTS server 161 for interacting with the hotspot marketing system 150. In an exemplary embodiment, these computer-readable program instructions may be implemented as an embedded script, such as JavaScript, in the HTS server 161. The program instructions may be embodied as a hotspot tracking application 164.

In block 210, the user 101 installs an HAA 115 on the user device 110. In certain exemplary embodiments, the user 101 may navigate to a website of a provider of the HAA 115 and download and install the HAA 115. The website that provides the HAA 115 may be the HTS website 153. The HAA 115 may be embedded in a digital wallet 112 on a user device 110. The user 101 may utilize a user interface of the HAA 115 for configuration. The user 101 may configure privacy settings provided by the HAA 115.

Additionally, the user 101 may communicate with the computer-readable program instructions on the HTS 160 to establish user identification and account configuration. The communication with the HTS 160 may be made via any available technology including, but not limited to, an Internet connection via the network 105, text, email, or a cellular connection. On the HTS 160 and the HAA 115, the user 101 may configure the categories of hotspots that are monitored. The user 101 may additionally configure privacy settings provided by the HTS 160.

The HAA 115 may additionally or alternatively communicate with the HTS 160 to establish the format in which the hotspot data should be transmitted. For example, an HAA 115 that does not employ a map display feature, may only require a listing of hotspots. An HAA 115 may request any other format or data that is available from the HTS 160.

The user 101 may additionally configure the alerting mechanism of the HAA 115. The HAA 115 may provide an audible alert, a vibration, a visible alert, such as showing the hotspot details on the display of the user device, or any other configurable alerting procedure. The alert may additionally or alternatively be incorporated by any other application that could benefit from the hotspot alert.

In block 215, the user 101 initiates the HAA 115 by actuating a physical or virtual button, making a motion such as a "tap" or swipe with the user device 110, speaking a voice command, or performing any other initiation process. The HAA 115 transmits to the HTS 160 the location of the user device 110. The HAA 115 may be configured to access the location data directly from the host CPU 116 of user device 110. The user device 110 may have the capability, through computer hardware or software, or a combination thereof, to determine the geographic coordinates of the location of the user device 110. For example, the user device 110 may utilize the Global Positioning System ("GPS") to determine its location.

Additionally or alternatively, the user device 110 may include a location-based application 114 that the HAA 115 or the HTS 160 may utilize to access location data for the user device 110. Examples of applications that may utilize the location data, and thus may make it available to the HTS 160, may include, but would not be limited to, business finder applications such as AROUNDME, location based social networks such as FOURSQUARE, location based gaming such as GOWALLA, or friend locater applications such as GOOGLE LATTITUDE.

In block 220, the HTS 160 gathers hotspot location data and transmits the location data to the user device 110. The details of this step will be discussed in further detail with reference to method 220 of FIG. 3.

In block 225, the user device 110 incorporates the hotspot data into the user interface of the HAA 115. The HAA 115 may display the information on a map or other grid via the user interface of the HAA. Additionally or alternatively, the HAA 115 may display the information to the user in any other format that can convey the information, such as a simple listing of each hotspot and the distance away from the user that each hotspot is located. The HAA 115 may further provide a route to a hotspot upon request from the user. The user 101 may elect to operate the HAA 115 in the foreground of the host CPU 116 operating system and provide substantially instant alerts as the user 101 moves through the hotspot zone. The HAA 115 may alternatively operate in the background of the operating system and store the hotspot alerts for later access by the user 101.

In block 230, the HAA 115 monitors the location of the user device 110 as it moves through the hotspot zone. The HAA 115 compares the location of the user device 110 to known hotspots identified on the most recent hotspot zone. The HAA 115 continually or intermittently determines if the user device is within a configured distance from a hotspot.

In block 235, the HAA 115 determines if a hotspot is being approached. For example, if a user 101 is walking through a shopping district with the user device 110 and comes within a specified distance of a hotspot, such as one block, the HAA 115 recognizes the approached hotspot. If a hotspot is being approached, the method 200 follows the "YES" branch of block 235 to block 237. If no hotspot is being approached, the method 200 follows the "NO" branch of block 235 to 230.

Following the "NO" branch of block 235 to block 230, the HAA 115 continues to monitor the location of the user device 110 as previously described.

Following the "YES" branch of block 235 to block 237, a hotspot alert is triggered when the user device 110 moves within a configured range of a hotspot. In exemplary embodiments, the HAA 115 may use the alert internally or may provide an audible alert, a vibration, a visible alert, such as showing the hotspot details on the display of the user device, an e-mail, or any other configurable alerting procedure.

In an alternate embodiment, the HAA 115 may alert the HTS 160 that the device is approaching a hotspot. The HTS 160 may perform any alert function configured by the user or store the alert for later use. The HTS 160 may send an alert to the HAA 115 or to another location. For example, the HTS 160 may send an email, push notification, text message, or another communication to the user.

In an alternative embodiment, the HAA 115 may be configured to alert the user 101 of only the higher priority hotspots. As discussed in the details of method 220 of FIG. 3, the hotspot data may be prioritized by the HTS 160. The HAA 115 may use the priority of the hotspot data to determine which hotspots will trigger an alert to the user 101. For example, the user 101 may desire to limit the alerts to the 10 highest priority hotspots in a given zone. Alternatively, the user 101 may configure the HAA 115 to alert the user 101 to every hotspot in the zone.

In block 240, if the user device 110 approaches a configured distance from the boundary of the hotspot zone, the method 200 follows the "YES" branch of block 240 to block 220. If the user device 110 has not approached a configured boundary of the hotspot zone, the method 200 follows the "NO" branch of block 240 to block 245. In an alternate embodiment of the application, the HAA 115 may require the user device 110 to completely exit the boundaries of the hotspot zone to follow the "YES" branch of block 240.

Following the "YES" branch of block 240 to block 220, the method requests and receive a refreshed hotspot zone. As the user device 110 has left the boundaries of the previous hotspot zone, the HAA 115 will have no hotspot data to display to the user 101 or monitor for alerts. A new hotspot zone with a new list of hotspots is transmitted to the user device 110.

Following the "NO" branch of block 240 to block 245, the user device 110 determines if the user device 110 has received a new hotspot zone in a configured amount of time. For instance, if a user device 110 has remained in one location for a configured time or has not encountered any hotspots for a configured time, the method 200 will determine that the user device 110 is idle and follow the "YES" branch of block 245 to block 220. A new hotspot zone with a new list of hotspots is transmitted to the user device 110. The idle time required to trigger the "YES" branch of block 245 is configurable by the user 101 or the HAA 115. For example, the idle time required might be one hour, one day, one week, or any other time that is reasonable based upon the activities of the user 101.

If the device has not remained idle and has received a new hotspot zone within the configured time, the method 200 follows the "NO" branch of block 245 to block 230. The device will continue monitoring the location of the user device 110.

The method 200 continues until the user 101 deactivates the HAA 115 or the user device is shut down.

Figure 3:
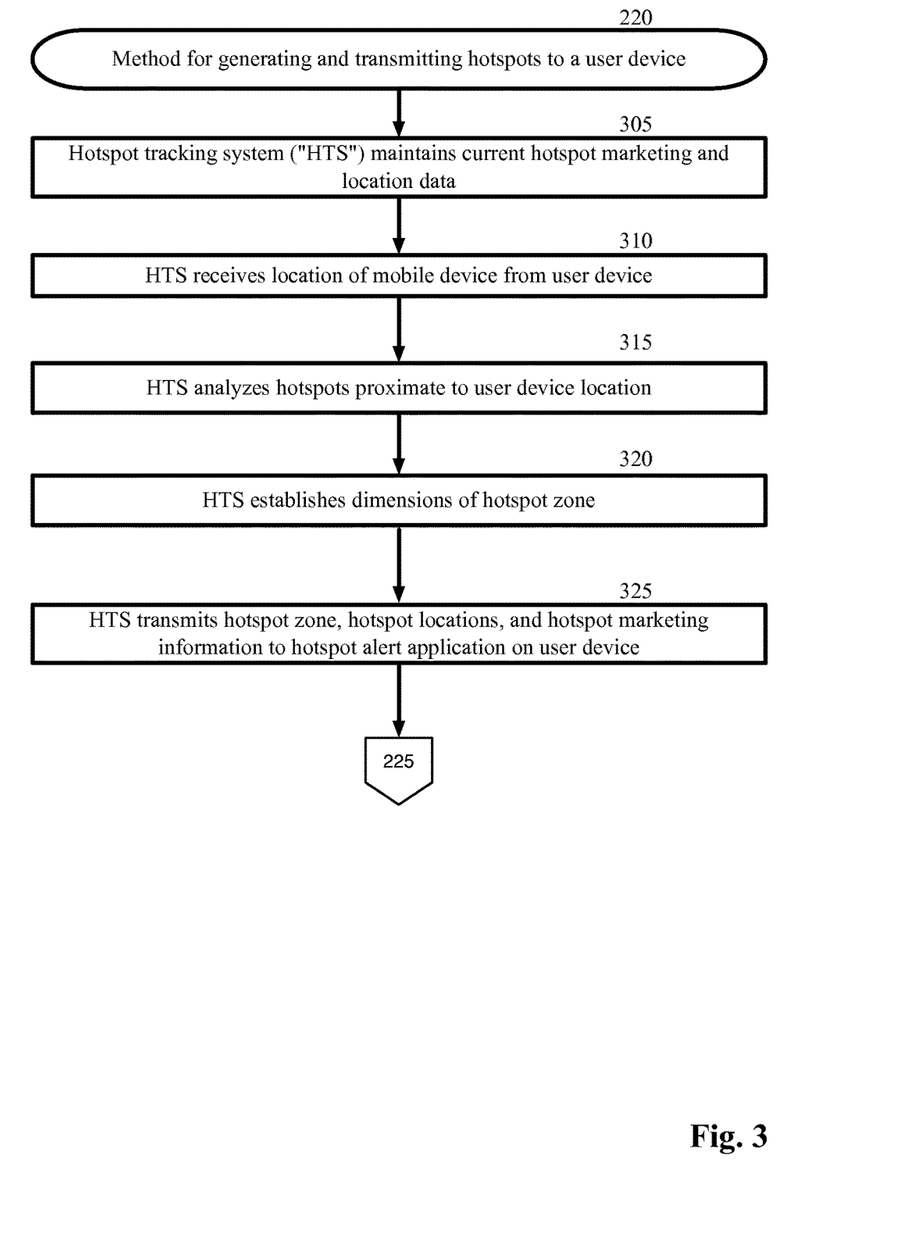
FIG. 3 is a block flow diagram depicting a method for generating and transmitting hotspots to a user device, in accordance with certain exemplary embodiments.

FIG. 3 is a flow chart depicting a method 220 for generating and transmitting hotspots to a user device, in accordance with certain exemplary embodiments.

With reference to FIGS. 1 and 2, in block 305 of method 220, the HTS 160 establishes and maintains current marketing and location data of hotspots that relate to a user 101. The hotspot information may be anything would be of interest to the user. The category of hotspot information accessed might be user configured or may be selected by the HTS server 161 based on the prior activities, interests, or suggestions of the user 101. Examples of hotspots that may be identified by the server 161 for transmitting to the user device 110 might include, but would not be limited to, restaurants, stores or other businesses frequented by the user 101, businesses currently offering a sale or promotion, businesses currently offering an electronic coupon, tourist attractions, museums, friends identified by their devices, or any other identifiable entity in which the user 101 may be interested.

The HTS 160 may access hotspot data from any system that may be polled by the HTS 160 to gather hotspot information. For example, the hotspot data may be gathered from a hotspot marketing system 150. A hotspot marketing system 150 may be the marketing system of a product manufacturer or a service provider. The hotspot marketing system 150 may be a social network system of a user that can provide preferences and historical data of a user's activities, a coupon aggregator or provider, a mapping system, or any other service or system that may provide information that the HTS 160 can use to define a hotspot zone and prioritize the hotspots.

In block 310, the HTS 160 receives the location of the user device 110. The HTS 160 stores the location of the user device 110 in the user account. In block 315, the HTS 160 identifies the hotspots in the vicinity. The HTS 160 may access the database maintained for the account of the user 101. The distance of each possible hotspot from the location of the user 101 is calculated and stored.

In block 320, the HTS 160 uses the density or quality of the hotspot information to establish the size of the hotspot zone to transmit to the user device 110. The HTS 160 may limit the size of the hotspot zone to prevent any adverse effects caused by transmitting a quantity of data that is too large for the user device 110 and the system to operate efficiently. For example, if the amount of hotspot data transmitted is too large, the data may require enough capacity on the data storage unit 113 of the user device 110 to affect the normal operation of the user device 110. Alternatively, if the size of the hotspot zone is too small then the HTS 160 may be forced to transmit a new zone of hotspots to the user device 110 too frequently to be practical. For example, if the hotspot zone data were transmitted too frequently, it might consume the battery life of the user device 110.

The size of the hotspot zone around the current location of the user device 110 can be determined based on the density or quality of the hotspot information. In an exemplary embodiment, the size of the hotspot zone may be established to encompass a configured number of hotspots in the proximity of the user device 110. For example, the size of the hotspot zone can be configured to encompass the specified number of hotspots that are closest to the user device 110 or that provide the highest priority hotspots around the user device 110. Thus, in an area of high concentration of available hotspots, the hotspot zone may be relatively small to capture the specified number of hotspots. Alternatively, in an area of lower concentration of available hotspots, the hotspot zone may be relatively large to capture the specified number of hotspots. Additionally, the size of the hotspot zone can take any suitable shape to encompass the specified hotspots.

The HTS 160 may additionally prioritize the hotspot data. Based on input of the user 101 or an analysis of historical data, such as purchasing history or website usage of the user 101, the HTS 160 may provide a ranked list of the hotspots to the user device 110. For example, the HTS 160 may be able to determine that a user 101 prefers a certain store or restaurant and rank it higher than an alternative restaurant even if the alternative restaurant is closer to the user 101 location. Thus, if the user 101 limits the number of hotspot alerts in a given zone, a lower ranked hotspot may be ignored in favor of a nearby, higher ranked hotspot.

Another example of a prioritizing factor might be the value or quantity of coupons or offers being marketed by a hotspot. For example, the HAA 115 may not alert a user 101 to a nearby hotspot if a better promotion is being offered by a neighboring business.

If displaying the information on a map view, the HAA 115 may expand or collapse the data displayed to the user depending on the density of the data. For example, if a large number of hotspots are located in a localized area, the HAA 115 may group hotspots together and show the grouping in a single icon or notation. An example of this may be a shopping complex that contains a quantity of hotspots too great to display on a user device. The display may show a shopping complex notation and list the number of hotspots contained at that location or any other manner of representing the group of hotspots. As the user 101 approaches the dense hotspot, the grouped hotspot may expand to show the individual hotspots in that area. For example, if the user 101 is between two shopping malls or between two cities, a single hotspot may be provided for each mall or each city, respectively. Then, as the user approaches one of the malls or one of the cities, the collapsed hotspot for that mall or city expands to show all hotspots (or a specified number of hotspots) at that location.

In certain exemplary embodiments, the HTS 160 applies the extracted data to a machine learning algorithm or another statistical model to determine the most effective ranking system. For example, a machine learning algorithm can be performed on the hotspots generated for one or more users to learn the ranking system that produces results having the highest usage rates. The machine learning algorithm can be updated periodically.

In block 325, the HTS 160 transmits the hotspot zone dimensions, the hotspot identities and locations, and any associated hotspot marketing information to the HAA 115. The HTS 160 may additionally transmit the priority ranking of each of the hotspots for use by the HAA 115.

From block 325, the method 220 proceeds to block 225 with reference to FIG. 2. General One or more aspects of the invention may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing systems. Moreover, any reference to an act being performed by a computer should not be construed as being performed by a single computer as the act may be performed by more than one computer. The inventive functionality of the invention will be explained in more detail in the following description, read in conjunction with the figures illustrating the program flow.

The exemplary embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The exemplary methods and acts described in the embodiments presented previously are illustrative, and, in alternative embodiments, certain acts can be performed in a different order, in parallel with one another, omitted entirely, and/or combined between different exemplary embodiments, and/or certain additional acts can be performed, without departing from the scope and spirit of the invention. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent acts corresponding to, the disclosed aspects of the exemplary embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A method comprising:
communicating, by a client network device to a remote network device, a request for hotspot data corresponding to hotspots within a proximity of the user network device, the request comprising first location data for the client network device;
receiving, by the client network device, the hotspot data from the remote network device, the hotspot data comprising identifications of a plurality of hotspots in a hotspot zone defined by the remote network device, wherein the hotspot zone is disposed in the proximity of the user network device based on the first location data of the client network device, the plurality of hotspots being selected based on a quality of the hotspots, wherein a size of the hotspot zone is determined based on a number available hotpots in the proximity of the client network device, and the hotspot zone comprises a configured number of hotspots;
receiving, by the client network device from the remote network device, an identification of a priority rank for each of the plurality of hotspots that is based on the quality of the hotspots;
selecting, by the client network device, a first hotspot of the plurality of hotspots responsive to the priority rank of the first hotspot exceeding a specified limit;
determining, by the client network device, that second location data of the client network device indicates that the client network device is within a configured range of the selected first hotspot; and
providing, by the client network device, an alert regarding the selected first hotspot responsive to the determination that the second location data of the client network device indicates that the client network device is within the configured range of the selected first hotspot.

2. The method of claim 1, wherein the size of the hotspot zone is further based on a quantity of data to be received from the remote network device.

3. The method of claim 1, wherein the size of the hotspot zone is further based on a capacity of a data storage unit of the client network device.

4. The method of claim 1, wherein determining that the second location data of the client network device indicates that the client network device is within the configured range of the selected first hotspot further comprises:
transmitting, by the client network device, the second location information to the remote network device; and
receiving, by the client network device from the remote network device, an indication that the client network device is within the configured range of the selected first place of interest.

5. The method of claim 1, wherein receiving the identification of the priority rank for each of the plurality of hotspots further comprises receiving a priority ranking that is based on a purchase history associated with the client network device.

6. The method of claim 1, further comprising acquiring, by the client network device, the first location data from an application executing on the client network device.

7. The method of claim 1, wherein providing the selected first hotspot comprises displaying the selected first hotspot in a list.

8. The method of claim 1 further comprising:
triggering, via the client network device, a visual alert responsive to the second location data of the client network device indicating that the client network device is within the configured range of the selected first hotspot.

9. A non-transitory computer readable storage device storing instructions that, when executed by one or more processors, cause the one or more processors to perform operations comprising:
acquiring, from a GPS unit of a client network device, first location data indicative of a location of the client network device;
communicating, by the client network device to a remote network device, a request for hotspot data corresponding to hotspots within a proximity of the user network device, the request comprising the first location data for the client network device;
receiving, by the client network device, the hotspot data from the remote network device, the hotspot data comprising identifications of a plurality of hotspots in a hotspot zone defined by the remote network device, wherein the hotspot zone is disposed in the proximity of the user network device based on the first location data of the client network device, wherein a size of the hotspot zone is determined based on based a density of available hotpots in the proximity of the client network device, and the hotspot zone comprises a configure number of hotspots;
receiving, by the client network device, an identification of a priority rank for each of the plurality of hotspots that is based on a quality of the hotspots included in the hotspot zone;
selecting, by the client network device, a first hotspot of the plurality of hotspots responsive to the priority rank of the selected first hotspot exceeding a specified limit;
determining, by the client network device, that second location data of the client network device indicates that the client network device is within a configured range of the selected first hotspot; and
providing, by the client network device, an alert regarding the selected first hotspot responsive to the determination that the second location data of the client network device indicates that the client network device is within the configured range of the selected first hotspot.

10. The non-transitory computer readable storage device of claim 9, wherein providing the alert regarding the selected first hotspot comprises displaying the selected first hotspot on a map.

11. The non-transitory computer readable storage device of claim 10 storing further instructions that, when executed by one or more processors, cause the one or more processors to perform operations further comprising:
displaying, via the display of the client network device, a route to the selected first hotspot on the map responsive to a user request.

12. The non-transitory computer readable storage device of claim 11, wherein displaying the selected first hotspot is further responsive to a tap.

13. A system comprising:
one or more processors; and
one or more storage devices storing instructions that, when executed by the one or more processors, cause the one or more processors to perform operations comprising:
establishing a database of hotspots specifying a quality of the hotspots, an identify of the hotspots, and a location of the hotspots;

receiving, from a client network device, first location data indicative of a location of the client network device acquired from a GPS unit of the client network device;

searching the database of hotspots for a plurality of hotspots proximate to the user network device based on the first location data;

ranking the plurality of hotspots using a configured priority protocol that is based on the quality of the plurality of hotspots;

selecting a configured number of highest ranked hotspots of the plurality of hotspots;

determining, by a computer, a set of boundaries that define a hotspot zone in a vicinity of the client network device based on the first location data, the hotspot zone comprising the selected configured number of highest ranked hotspots; and transmitting the boundaries of the hotspot zone and the locations and identifications of the hotspots contained therein to the client network device.

14. The system of claim 13, wherein configured number is based on a quantity of data to be transmitted to the client network device.

15. The system of claim 13, wherein the configured number is based on a capacity of a data storage unit of the client network device.

16. The system of claim 13, wherein the quality of the plurality of hotspots is based on a purchase history or a history of website usage of the client device.

17. The system of claim 13, wherein the quality of the plurality of hotspots is based on the respective proximities of the plurality of hotspots to the client device.

* * * * *